United States Patent
Martin et al.

(10) Patent No.: US 10,082,990 B2
(45) Date of Patent: Sep. 25, 2018

(54) PRINTHEAD DATA ERROR DETECTION AND RESPONSE

(71) Applicant: HEWLETT-PACKARD DEVELOPMENT COMPANY, L.P., Houston, TX (US)

(72) Inventors: Eric T Martin, Corvallis, OR (US); Christopher Hans Bakker, Corvallis, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/519,273

(22) PCT Filed: Oct. 29, 2014

(86) PCT No.: PCT/US2014/062808
§ 371 (c)(1),
(2) Date: Apr. 14, 2017

(87) PCT Pub. No.: WO2016/068898
PCT Pub. Date: May 6, 2016

(65) Prior Publication Data
US 2017/0242633 A1   Aug. 24, 2017

(51) Int. Cl.
| | | |
|---|---|---|
| G06F 15/00 | (2006.01) | |
| G06F 1/00 | (2006.01) | |
| G06K 1/00 | (2006.01) | |
| G06K 15/00 | (2006.01) | |
| G06F 3/12 | (2006.01) | |
| G06K 15/10 | (2006.01) | |
| G06F 11/08 | (2006.01) | |

(52) U.S. Cl.
CPC ............ *G06F 3/121* (2013.01); *G06F 3/1234* (2013.01); *G06F 3/1279* (2013.01); *G06F 11/08* (2013.01); *G06K 15/102* (2013.01); *G06K 15/408* (2013.01)

(58) Field of Classification Search
CPC ...... G06F 3/121; G06F 3/1234; G06F 3/1279; G06K 15/102; G06K 15/408
USPC .......................... 358/1.14, 1.15, 1.7, 1.8, 1.1
See application file for complete search history.

(56) References Cited

U.S. PATENT DOCUMENTS

| | | | |
|---|---|---|---|
| 7,390,071 | B2 | 6/2008 | Walmsley et al. |
| 8,259,334 | B2 | 9/2012 | Gardner et al. |
| 2002/0186265 | A1 | 12/2002 | Schloeman et al. |
| 2003/0107611 | A1 | 6/2003 | Kim |
| 2005/0212831 | A1 | 9/2005 | Graf et al. |
| 2005/0248604 | A1 | 11/2005 | Schremp |

(Continued)

FOREIGN PATENT DOCUMENTS

| | | |
|---|---|---|
| CN | 103057286 A | 4/2013 |
| EP | 1814063 | 2/2010 |

(Continued)

*Primary Examiner* — Douglas Tran
(74) *Attorney, Agent, or Firm* — Trop Pruner & Hu PC (57) ABSTRACT

A printhead assembly includes ink ejection devices having nozzles, and processing electronics in communication with the ink ejection devices. The processing electronics implement logic to receive nozzle data for controlling the ink ejection devices, receive error detection data associated with the nozzle data, detect errors associated with the nozzle data using the error detection data, and generate fault data for the detected errors.

20 Claims, 5 Drawing Sheets

(56) References Cited

U.S. PATENT DOCUMENTS

| | | | |
|---|---|---|---|
| 2006/0192799 A1* | 8/2006 | Vega | G06K 15/107 347/9 |
| 2008/0303849 A1 | 12/2008 | Edelen et al. | |
| 2011/0234673 A1* | 9/2011 | Ueshima | B41J 2/2139 347/14 |
| 2011/0273507 A1 | 11/2011 | Yamato et al. | |
| 2018/0008995 A1* | 1/2018 | Baker | B41J 2/04581 |

FOREIGN PATENT DOCUMENTS

| | | |
|---|---|---|
| WO | WO2004088577 A1 | 10/2004 |
| WO | WO2014008944 A1 | 1/2014 |

\* cited by examiner

PRINTHEAD DATA ERROR DETECTION AND RESPONSE

BACKGROUND

Data integrity problems due to printhead data transmission errors may sometimes occur in a printing system. Data transmission errors may include, for example, errors due to improper insertion of a print module into the printing system, environmental conditions affecting the printing system, etc. Due to high cost of print media and run times for some printing applications, it is desirable that the printing system be equipped to respond to data integrity problems in a timely manner. Some current printing systems may utilize diagnostic print patterns that may be scanned and analyzed by the printing system to detect data integrity problems, but only during pauses between printed pages or after completed print jobs. Some current printing systems run diagnostic tests to ensure electrical continuity to printheads in the printing system, but only during pauses between printed pages or after completed print jobs. Consequently, if a printhead data transmission error occurs during a large print job, the compromised print job may complete before the data transmission error is detected, resulting in costly wasted ink, print media, and print system run time.

DETAILED DESCRIPTION OF EXAMPLES

Examples of printhead assemblies and printing systems having printhead data error detection and response capabilities are disclosed herein. The integrity of data transmission from printing systems to printhead assemblies is of increasing concern for several reasons. First, in some large format printers, the printheads are of considerable mass and, if installed incorrectly, may easily be damaged or misaligned, causing printhead data transmission errors. Further, data rates to printheads continue to increase, and in many cases the wafer processing technologies to integrate circuits on printheads are optimized for cost and power delivery, at the compromise of low-voltage switching speed. With increasing data rates, performance margins are decreasing. Additionally, in some applications, print media may be costly. When a data transmission error occurs, it is desirable for the print system to be notified as quickly as possible so that, if the error is catastrophic enough, the print job can be cancelled and errors addressed. Even further, in high-speed print systems, aerosol can be a significant problem, which can affect data integrity by creating conductive paths on print system electronics.

Additionally, not all data transmission errors are of equal consequence. For example, some data transmission errors affect only individual nozzles, and a single incorrect firing or missed firing of a single nozzle may not be perceptible to the customer, and such a data transmission error may not justify action by the print system. Other data transmission errors, such as embedded address bits, may affect the firing of all or groups of nozzles, and many nozzles may fire incorrectly, resulting in significant degradation of print quality. Accordingly, the printing system needs to know when a critical data transmission error has occurred. Further, even if the printing system does not respond explicitly to every data transmission error, it is useful for the print system to track and monitor such errors so that data integrity trends may be identified early. The example printhead assemblies and printing systems disclosed herein may provide monitoring of printhead data integrity during print jobs (i.e., while the printing system is actively printing as opposed to during pauses between pages or after a completed print job), including detection of and differentiation between critical and non-critical printhead data transmission errors. The example printhead assemblies and printing systems disclosed herein may also provide appropriate responses to critical and non-critical data transmission errors.

Figure 1:
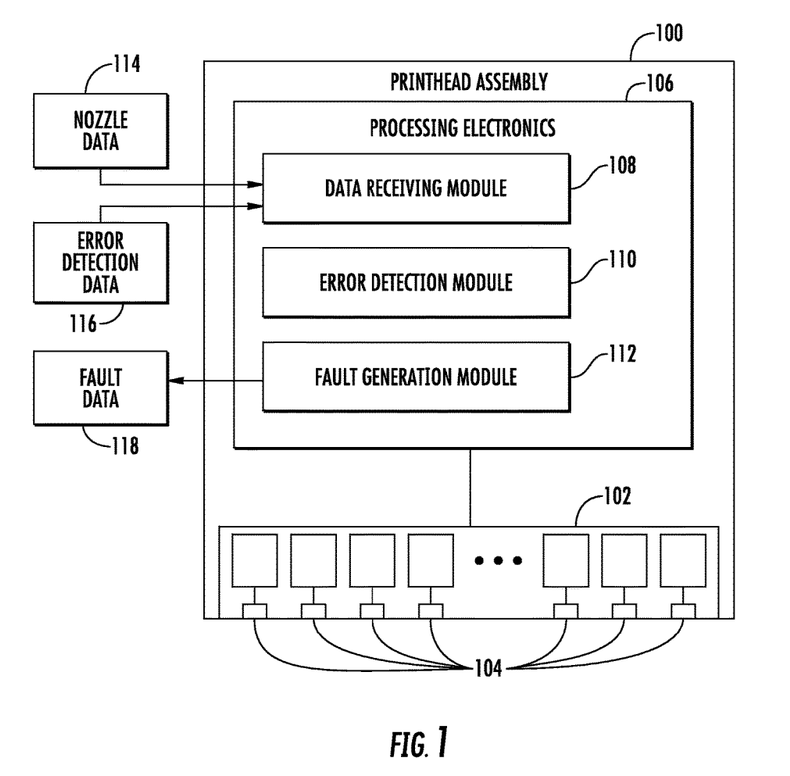
FIG. 1 is a schematic illustration of an example printhead assembly having data error detection capabilities.

FIG. 1 schematically illustrates an example printhead assembly 100. As will be described hereafter, printhead assembly 100 includes data error detection capabilities. Printhead assembly 100 may be, for example, a thermal or piezoelectric inkjet printhead for use in commercial inkjet printers, such as inkjet printers manufactured by Hewlett Packard Company, assignee of the present application. Printhead assembly 100 may be used in other types of printers as well. In general, printhead assembly 100 may receive nozzle data from a printing system that instructs printhead assembly 100 to eject droplets of ink onto a print medium by firing nozzles within an array of ink ejection devices in a particular sequence (i.e., by energizing the ink ejection devices with electrical signals). Printhead assembly 100 may further receive data from the printing system that enables printhead assembly 100 to carry out error detection with respect to the nozzle data.

In some examples, printhead assembly 100 may include an electrical interface for connection to a printing system, and a fluid interface for connection to an ink reservoir that supplies ink (e.g., black, red, blue, yellow, etc.) to printhead assembly 100. In some examples, the fluid interface and ink reservoir may supply a single color of ink, while in other examples, the fluid interface and ink reservoir may supply multiple colors of ink. In some examples, printhead assembly 100 may be housed within an inkjet cartridge along with the ink reservoir, while in other examples, the ink reservoir may be a separate component, such as a component of the printing system. In some examples, printhead assembly 100 may be coupled to or supported by an interface included in a printing system, such as an inkjet printing system. The printing system interface may provide electrical and fluidic connections to printhead assembly 100. The printing system interface may also provide mechanical structure for positioning printhead assembly 100 relative to a print media transport assembly of the printing system so that printhead assembly 100 may eject drops of ink toward print media (e.g., paper, cardstock, etc.) to print, for example, characters, lines, shapes, symbols, images on the print media (e.g., black and white, grayscale, color, etc.) upon receiving nozzle data from the printing system.

As illustrated in FIG. 1, printhead assembly 100 may include ink ejection devices 102 having nozzles 104. In some examples, ink ejection devices 102 may be constructed in arrays on a silicon wafer or other suitable material using, for example, a photolithographic process that uses a combination of masking, depositing, and etching steps in order to form electrical circuits, fluidic channels, and other structures that make up ink ejection devices 102. For example, an ink ejection device 102 may include a firing resistor and a vaporization chamber in addition to a nozzle 104. An array of ink ejection devices 102 may include columns of ink ejection devices 102 in communication with an ink feed slot. Individual print die having an array of ink ejection devices 102 may then be separated from the other die on the silicon wafer. Other manufacturing processes may be used as well to create ink ejection devices 102. Printhead assembly 100 may also include a die carrier. The die carrier may provide the electrical and fluidic connections described above between printhead assembly 100 and, for example, a commercial inkjet printing system. The die carrier may also provide structural support for print die including ink ejection devices 102. For example, print die may be partially inserted into and seated within a cavity of the die carrier such that the die are generally held in position, with portions of the print die extending outward from the die carrier such that nozzles 104 are exposed. Printhead assembly 100 may contain any suitable number of ink ejection devices 102, as well as any suitable number of corresponding print dies and die carriers.

An array of ink ejection devices 102 and their corresponding nozzles 104 may be organized into primitives and primitive groups with respect to ink feed slots. The term "primitive" as used herein refers to a grouping of ink ejection devices 102 and their corresponding nozzles. The term "primitive group" as used herein refers to a grouping of primitives. Each nozzle within a primitive may be assigned an address. The number of ink ejection devices 102 and their corresponding nozzles 104 may vary from primitive to primitive. In some examples, the same number of ink ejection devices 102 and their corresponding nozzles 104 are included in each primitive. Similarly, the number of primitives in each primitive group may vary, or may be the same.

Figure 2:
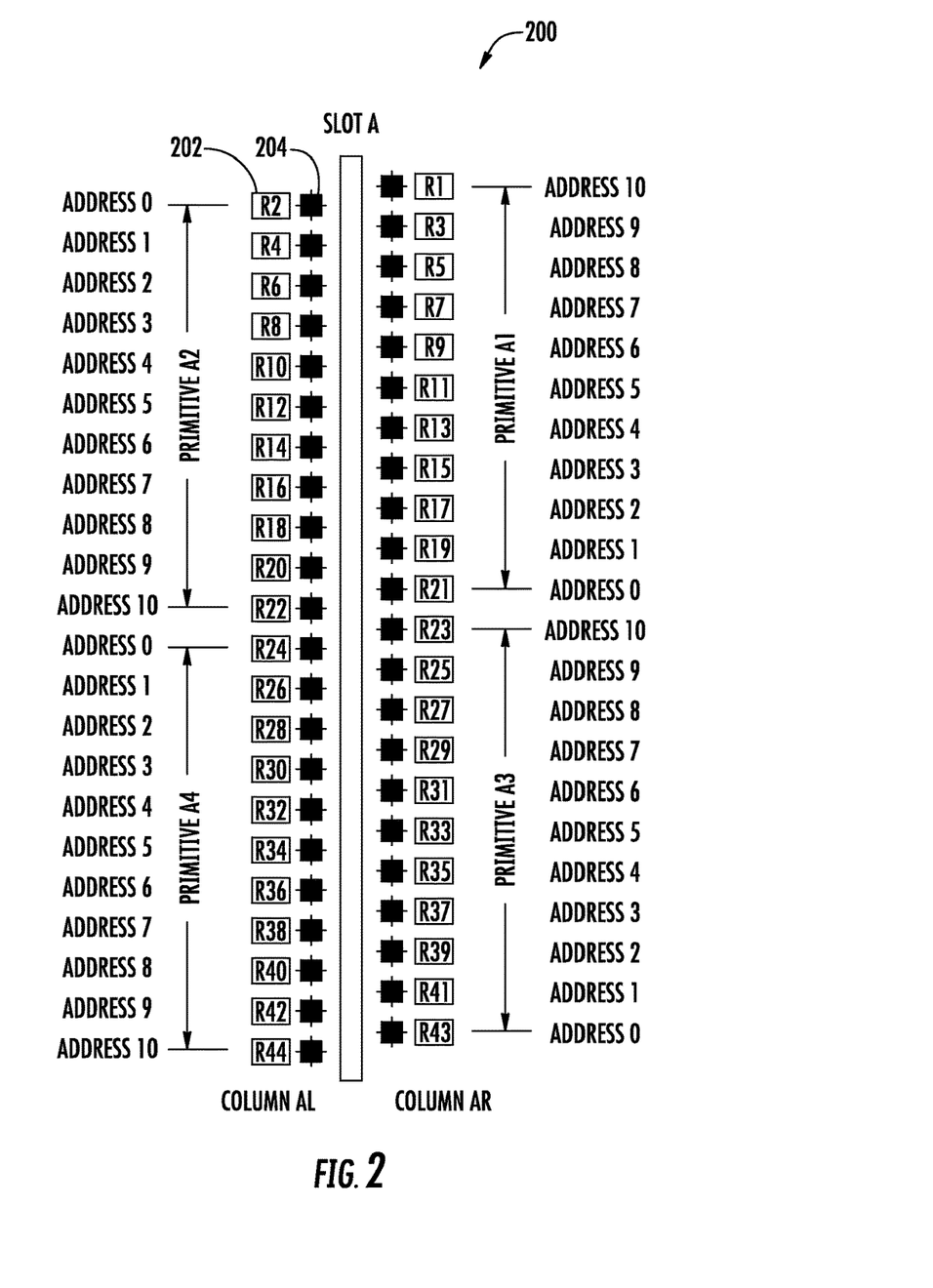
FIG. 2 is a diagram illustrating an example array of ink ejection devices and their corresponding nozzles that may be included in the printhead assembly of FIG. 1.

FIG. 2 is a diagram illustrating an example array 200 of ink ejection devices 202 and their corresponding nozzles 204 that may be included in printhead assembly 100. As shown in FIG. 2, ink ejection devices 202 and their corresponding nozzles 204 may be aligned into columns AL and AR with respect to ink slot A. Columns AL and AR may each form a primitive group. Ink ejection devices 202 and their corresponding nozzles 204 may also be grouped into primitives A1, A2, A3, and A4. The primitive group corresponding to column AL may include primitives A2 and A4. The primitive group corresponding to column AR may include primitives A1 and A3. Each nozzle in primitives A1, A2, A3, and A4 be assigned an address ranging from Address 0 to Address 10.

Referring again to FIG. 1, printhead assembly 100 may also include processing electronics 106. Processing electronics 106 may include, for example, a processing unit configured to execute logic in the form of software instruction modules contained in a memory. For purposes of this application, the term "processing unit" shall mean a presently developed or future developed processing unit that executes sequences of instructions contained in a memory. In general, upon executing instructions contained in the memory, the processing unit may provide error detection capability in printhead assembly 100. The instructions may be loaded in a random access memory (RAM) for execution by the processing unit from a read only memory (ROM), a mass storage device, or some other persistent storage. In some examples, hardwired circuitry modules may be used in place of or in combination with software instruction modules in processing electronics 106 to implement the functionality described herein. For example, the error detection functionality of printhead assembly 100 may be implemented entirely or in part by logic contained in an application-specific integrated circuit (ASIC). Unless otherwise specifically noted, processing electronics 106 is not limited to any specific combination of hardware circuitry modules and software instruction modules, nor to any particular source for the instructions executed by the processing unit.

Memory may include a non-transitory computer-readable medium. The term "non-transitory computer-readable medium" as used herein includes any computer readable medium, excluding only transitory propagating signals per se. Memory may include, for example any non-volatile or volatile memory such as DRAM, RAM, ROM, register memory, or some combination of these; for example a hard disk combined with RAM. Memory may store instructions for execution by a processing unit. In some examples, memory may further store data for use by a processing unit. Memory may store various software or code modules that direct a processing unit to carry out various interrelated actions.

As shown in FIG. 1, processing electronics 106 may include data receiving module 108, error detection module 110, and fault generation module 112. Modules 108, 110, and 112 may cooperate to cause processing electronics 106 to carry out the process 300 set forth by the flow diagram of FIG. 3. As indicated by a step 302, data receiving module 108 may receive nozzle data 114 for controlling ink ejection devices 102. Nozzle data 114 may be received from, for example, a printing system in communication with printhead assembly 100 in the form of a data packet. Nozzle data 114 may include, for example, nozzle address data, primitive firing data, and fire signal data. For example, a nozzle data packet may include start bits that may be used by data receiving module 108 to recognize the start of the nozzle data packet. The start bits may also include fire signal data. The start bits may then be followed by nozzle address data, primitive firing data, and stop bits indicating the end of the nozzle data packet.

Nozzle address data as used herein refers to data containing the address of a particular nozzle 104 in a primitive to receive primitive firing data. In some examples, all primitives within a primitive group may use the same address data. For example, referring again to FIG. 2, primitives A2 and A4 in the primitive group corresponding to column AL may use the same address data. Primitive firing data as used herein refers to data indicating that a nozzle firing should or should not occur for a particular nozzle 104 in a primitive as identified by corresponding nozzle address data. In some examples, unique primitive firing data may be sent to each primitive so that, while in some examples the same nozzle address data may be used for multiple primitives, unique primitive firing data may indicate that nozzles 104 in some of the primitives should fire while others should not. For example, referring again to FIG. 2, nozzle address data shared by primitives A2 and A4 may indicate that nozzles 204 having address 8 should receive primitive firing data, but the unique primitive firing data sent to primitive A2 may indicate that a nozzle firing should occur, while the unique primitive firing data sent to primitive A4 may indicate that a nozzle firing should not occur. Fire signal data as used herein refers to data indicating particular fire signal properties that may determine the firing energy and properties of the ink drop ejected from a particular nozzle 104 in a primitive. Such fire signal properties may include, for example, pulse width, duty cycle, number of pulses, etc. In some examples, all primitives within a primitive group use the same fire signal data.

In some examples, a particular nozzle 104 in a primitive fires when nozzle data 114 received by data receiving module 108 and sent to the primitive containing the particular nozzle 104 includes (a) address data that matches the address of the nozzle 104 in the primitive, (b) primitive firing data that indicates a nozzle firing should occur in the primitive, and (c) fire signal data. In some examples, only one nozzle 104 per primitive is fired at any given time in order to, for example, manage peak energy demands. In some examples, a packet of nozzle data 114 may be sent to each nozzle address in order to fire all desired nozzles 104 in a firing sequence.

Referring again to FIG. 3, as indicated by a step 304, data receiving module 108 may receive error detection data 116 associated with nozzle data 114. Error detection data 116 may be received from, for example, a printing system in communication with printhead assembly 100. Error detection data 116 may include, for example, error detection bits corresponding to nozzle address data, primitive firing data, and/or fire signal data included in nozzle data 114. In some examples, error detection bits may be included for some or all types of nozzle data 114 depending on such factors as impact on image quality, available data rates between printhead assembly 100 and a printing system, etc. By way of example, in some examples, data transmission errors associated with nozzle address data and/or fire signal data may have a greater impact on image quality than primitive firing data. For example, the same nozzle address data may be used for multiple primitives, while unique primitive firing data may be sent to each primitive. As such, error detection data 116 may include error detection bits corresponding to nozzle address data included in nozzle data 114, but not for primitive firing data included in nozzle data 114.

In some examples, error detection data 116 may include parity bits based on nozzle data 114. In some examples, error detection data 116 may include cyclic redundancy check (CRC) codes based on nozzle data 114. In some examples, error detection data 116 may include a checksum based on nozzle data 114. In some examples, error detection data 116 may include hash codes based on nozzle data 114. Other types of error detection codes and schemes are contemplated as well.

In some examples, nozzle data 114 and error detection data 116 may be integrated together into nozzle data packets. For example, a nozzle data packet may include start bits that may be used by data receiving module 108 to recognize the start of the nozzle data packet. The start bits may also include fire signal data, and may further include error detection data 116 associated with nozzle data 114. The start bits may then be followed by nozzle address data, primitive firing data, and stop bits indicating the end of the nozzle data packet. In some examples, error detection data 116 may include error detection bits corresponding to the entire nozzle data packet so that overall data packet errors may be detected. In some examples, error detection data 116 may be included in each nozzle data packet received by data receiving module 108, such that error detection may be performed for each nozzle data packet received by data receiving module 108. In some examples, error detection data 116 may be included less frequently, depending on factors such as impact on image quality, available data rates between printhead assembly 100 and a printing system, etc.

Figure 3:
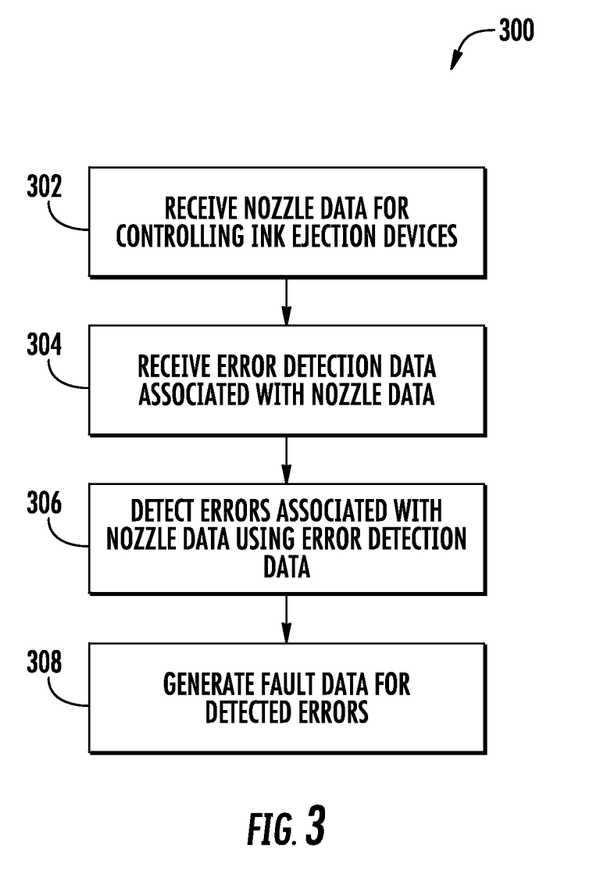
FIG. 3 is a flow diagram of an example process that may be carried out by the printhead assembly of FIG. 1.

As indicated by a step 306, error detection module 110 may detect errors associated with nozzle data 114 using error detection data 116. In some examples, error detection module 110 may implement a parity check (e.g., using even or odd parity bits in error detection data 116) to detect errors associated with nozzle data 114. In some examples, error detection module 110 may implement a CRC (e.g., using a CRC code included in error detection data 116 based on a generator polynomial) to detect errors associated with nozzle data 114. In some examples, error detection module 110 may implement a checksum function (e.g., using a checksum included in error detection data 116). In some examples, error detection module 110 may implement a cryptographic hash function (e.g., using a hash code included in error data 116). Other types of error detecting codes and checks are contemplated as well. In some examples, the particular type of error detection code and/or check may be selected based on the desired effectiveness of error detection, impact on image quality, available data rates between printhead assembly 100 and a printing system, etc.

In some examples, error detection module 110 may determine whether start bits for nozzle data packets have been received in order to provide an indication that error detection has been performed. If error detection module 110 receives start bits for a nozzle data packet (i.e., including any error detection data 116), it may store an indicator in, for example, a memory in processing electronics 106 that may be periodically checked by a printing system in communication with printhead assembly 100. The printing system may reset the indicator after each time it checks the indicator. Error detection module 110 may then store a new indicator upon receipt of start bits for a nozzle data packet.

As indicated by a step 308, fault generation module 312 may generate fault data 118 for errors detected by error detection module 110. Fault data 118 may indicate, for example, the number of detected errors, the types of detected errors, the sequence of detected errors, the frequency of detected errors, etc. In some examples, fault data 118 may be stored in a memory in processing electronics 106 and accessed by a printing system in communication with printhead assembly 100 during printing of a print job. In some examples, fault data 118 may be pushed to a printing system in communication with printhead assembly 100 during printing of a print job.

In some examples, data receiving module 108 may be in communication with a printing system over a relatively higher frequency data channel, such as a Low Voltage Differential Signaling (LVDS) data bus, which may be a uni-directional data bus for transmitting nozzle data packets to printhead assembly 100 at higher data rates required during print jobs. Printhead assembly 100 may also be in communication with the printing system over a relatively lower frequency data channel, such as a Command Status Input/Output (CSIO) data channel, which may be a bi-directional data channel used to, for example, configure thermal controls, firing parameters and monitor fault data using a lower data rate. CSIO data transmissions may be initiated by the printing system, and may include memory addresses in processing electronics 106 to be written to and read from, as well as any data to be written. Processing electronics 106 may then send an echo to the printing system indicating the memory locations written to and read from, the data written and read, and any fault indicators. In these examples, error detection may be performed for each nozzle data packet sent at the higher data rate during printing of a print job, and fault data 118 may be read from processing electronics 106 and communicated to the printing system using CSIO echoes during printing of the print job at the lower data rate.

In some examples, data receiving module 108 may be in communication with a printing system over a relatively higher frequency data channel, such as an LVDS data bus, which may be a bi-directional data bus for transmitting nozzle data packets to printhead assembly 100 at higher data rates required during print jobs. In these examples, error detection may be performed for each nozzle data packet sent at the higher data rate during printing of a print job, and fault data 118 may be similarly transmitted to the printing system during printing of the print job at the higher data rate.

Figure 4:
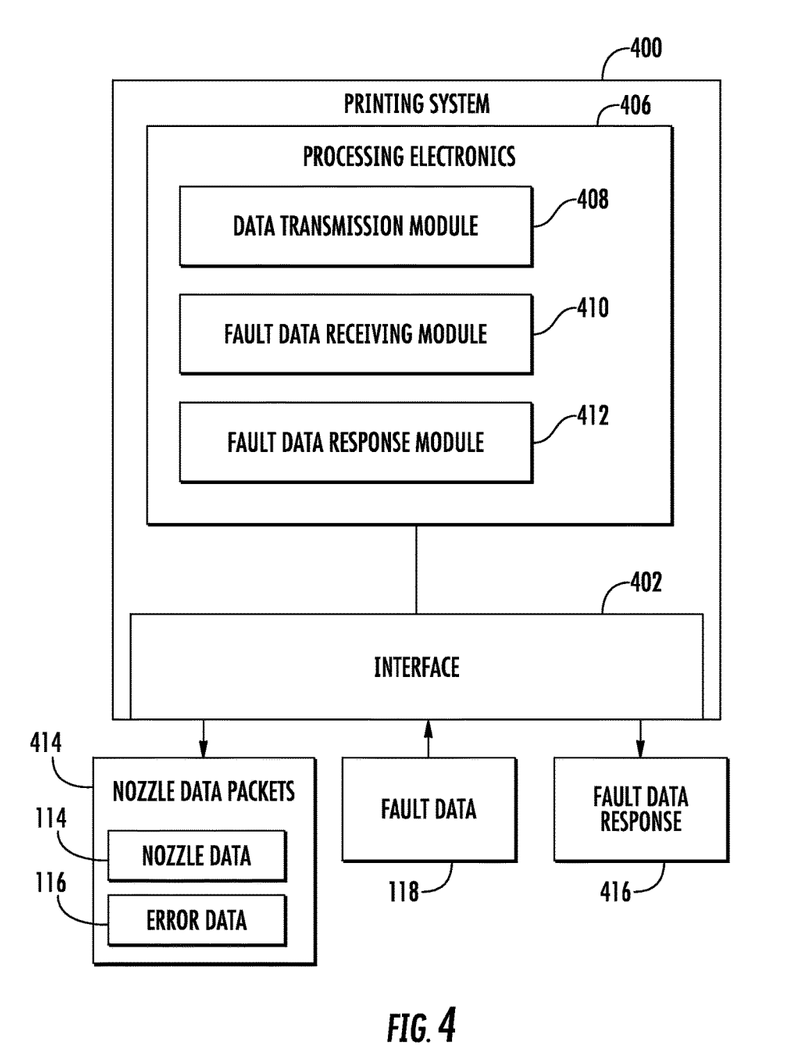
FIG. 4 is a schematic illustration of an example printing system for use with the printhead assembly of FIG. 1 to detect and respond to data errors.

FIG. 4 is a schematic illustration of an example printing system 400 for use with printhead assembly 100. As will be described hereafter, printing system 400 may include data error detection and response capabilities. Printing system 400 may be, for example, a commercial inkjet printer, such as an inkjet printer manufactured by Hewlett Packard Company, assignee of the present application. Printing system 400 may be other types of printers as well. Printing system 400 may utilize any suitable number of printhead assemblies 100 depending on the particular printing application. In general, printing system 400 may transmit nozzle data 114 to printhead assembly 100 that instructs printhead assembly 100 to eject droplets of ink onto a print medium by firing nozzles within an array of ink ejection devices in a particular sequence (i.e., by energizing the ink ejection devices with electrical signals). Printing system 400 may further transmit error detection data 116 to printhead assembly 100 that enables printhead assembly 100 to carry out error detection with respect to nozzle data 114. Printing system 400 may further receive fault data 118 from printhead assembly 100 based on detected errors in nozzle data 114 as received by printhead assembly 100, and may determine a response to fault data 118.

Printing system 400 may include an interface 402. Interface 402 may include an electrical interface for connection to printhead assembly 100. In some examples, printing system 400 may include a relatively higher frequency data channel, such as an LVDS data bus, which may be a uni-directional data bus for transmitting nozzle data 114 and error detection data 116 to printhead assembly 100 at higher data rates required during print jobs. Interface 402 may also include a relatively lower frequency data channel, such as a CSIO data channel, which may be a bi-directional data channel used to, for example, configure thermal controls, firing parameters and monitor fault data for printhead assembly 100 using a lower data rate. CSIO data transmissions may be initiated by printing system 400, and may include memory addresses in processing electronics 106 to be written to and read from, as well as any data to be written. Printing system 400 may then receive an echo from processing electronics 106 of printhead assembly 100 indicating the memory locations written to and read from, the data written and read, and any fault indicators. In these examples, fault data 118 may be read from processing electronics 106 and received by printing system 400 using CSIO echoes during printing of the print job at the lower data rate. Similarly, fault data responses may be sent to printhead assembly 100 using CSIO data transmissions during printing of the print job at the lower data rate.

In some examples, printing system 400 may include an LVDS data bus, which may be a bi-directional data bus for transmitting nozzle data 114 and error detection data 116 to printhead assembly 100 at higher data rates required during print jobs, as well as for receiving fault data. In these examples, fault data 118 may be transmitted from printhead assembly 100 to printing system 400 during printing of the print job at the higher data rate. Similarly, fault data responses may be sent to printhead assembly 100 during printing of the print job at the higher data rate.

In some examples, interface 402 may include a fluid interface for supplying ink (e.g., black, red, blue, yellow, etc.) to printhead assembly 100 from an ink reservoir included in printing system 400. In some examples, the fluid interface and ink reservoir may supply a single color of ink, while in other examples, the fluid interface and ink reservoir may supply multiple colors of ink. In some examples, interface 402 may be coupled to printhead assembly 100, provide support for printhead assembly 100, or otherwise provide mechanical structure for positioning printhead assembly 100 relative to a print media transport assembly of printing system 400 so that printhead assembly 100 may eject drops of ink toward print media (e.g., paper, cardstock, etc.) to print, for example, characters, lines, shapes, symbols, images on the print media (e.g., black and white, grayscale, color, etc.) upon receiving nozzle data from printing system 400.

Printing system 400 may also include processing electronics 406. Processing electronics 406 may include, for example, a processing unit configured to execute logic in the form of software instruction modules contained in a memory. In general, upon executing instructions contained in the memory, the processing unit may provide error detection and response capability in printing system 400. The instructions may be loaded in a random access memory (RAM) for execution by the processing unit from a read only memory (ROM), a mass storage device, or some other persistent storage. In some examples, hardwired circuitry modules may be used in place of or in combination with software instruction modules in processing electronics 406 to implement the functionality described herein. For example, the error detection and response functionality of printing system 400 may be implemented entirely or in part by logic contained in an ASIC. Unless otherwise specifically noted, processing electronics 406 is not limited to any specific combination of hardware circuitry modules and software instruction modules, nor to any particular source for the instructions executed by the processing unit.

Memory may include a non-transitory computer-readable medium. The term "non-transitory computer-readable medium" as used herein includes any computer readable medium, excluding only transitory propagating signals per se. Memory may include, for example any non-volatile or volatile memory such as DRAM, RAM, ROM, register memory, or some combination of these; for example a hard disk combined with RAM. Memory may store instructions for execution by a processing unit. In some examples, memory may further store data for use by a processing unit. Memory may store various software or code modules that direct a processing unit to carry out various interrelated actions.

As shown in FIG. 4, processing electronics 406 may include data transmission module 408, fault data receiving module 410, and fault data response module 412. Modules 408, 410, and 412 may cooperate to cause processing electronics 406 to carry out the process 500 set forth by the flow diagram of FIG. 5. As indicated by a step 502, data transmission module 408 may transmit nozzle data 114 for controlling ink ejection devices 102. Nozzle data 114 may be transmitted to, for example, a printhead assembly 100 in communication with printing system 400 in the form of a data packet. As described above, nozzle data 114 may include, for example, nozzle address data, primitive firing data, and fire signal data. For example, a nozzle data packet may include start bits that may be used by data receiving module 106 to recognize the start of the nozzle data packet. The start bits may also include fire signal data. The start bits may then be followed by nozzle address data, primitive firing data, and stop bits indicating the end of the nozzle data packet.

Figure 5:
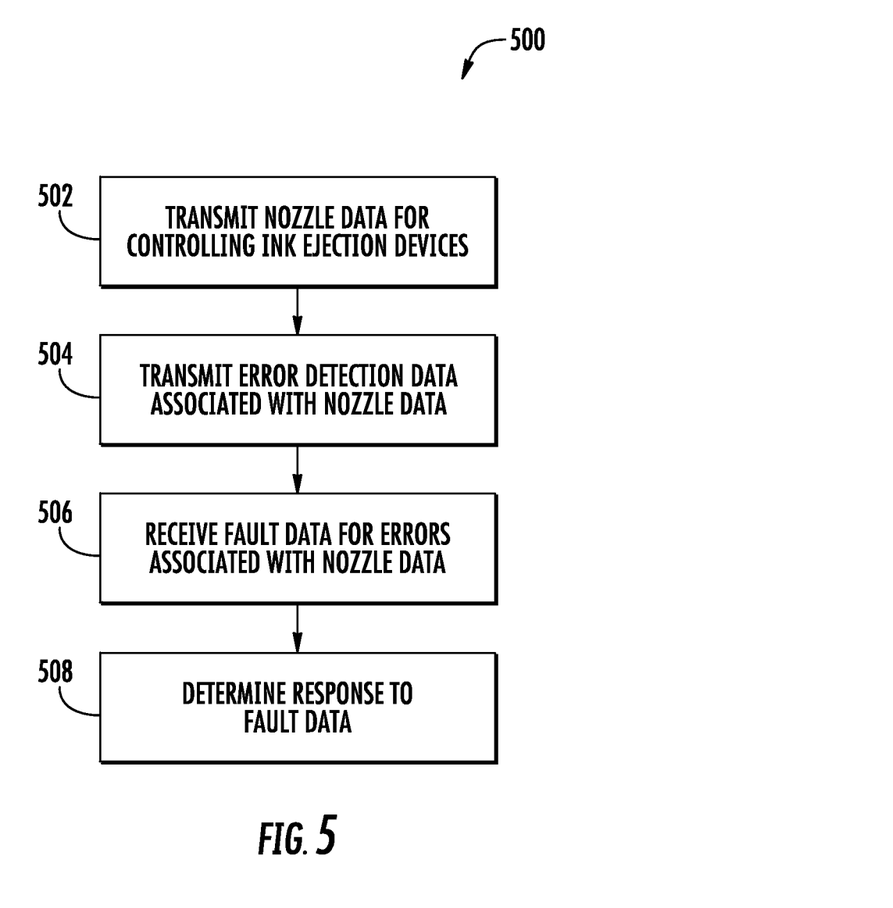
FIG. 5 is a flow diagram of an example process that may be carried out by the printing system of FIG. 4.

As indicated by a step 504, data transmission module 408 may transmit error detection data 116 associated with nozzle data 114. Error detection data 116 may be transmitted to, for example, a printhead assembly 100 in communication with printing system 400. As described above, error detection data 116 may include, for example, error detection bits corresponding to nozzle address data, primitive firing data, and/or fire signal data included in nozzle data 114. In some examples, error detection bits may be included for some or all types of nozzle data 114 depending on such factors as impact on image quality, available data rates between printhead assembly 100 and printing system 400, etc. By way of example, in some examples data transmission errors associated with nozzle address data and/or fire signal data may have a greater impact on image quality than primitive firing data. For example, the same nozzle address data may be used for multiple primitives, while unique primitive firing data may be sent to each primitive. As such, error detection data 116 may include error detection bits corresponding to nozzle address data included in nozzle data 114, but not for primitive firing data included in nozzle data 114.

In some examples, error detection data 116 may include parity bits based on nozzle data 114. In some examples, error detection data 116 may include CRC codes based on nozzle data 114. In some examples, error detection data 116 may include a checksum based on nozzle data 114. In some examples, error detection data 116 may include hash codes based on nozzle data 114. Other types of error detection codes and schemes are contemplated as well.

In some examples, nozzle data 114 and error detection data 116 may be integrated together into nozzle data packets 414. For example, a nozzle data packet 414 may include start bits that may be used to indicate the start of nozzle data packet 414. The start bits may also include fire signal data, and may further include error detection data associated with nozzle data 114. The start bits may then be followed by nozzle address data, primitive firing data, and stop bits indicating the end of nozzle data packet 414. In some examples, error detection data 116 may be included in each nozzle data packet 414 transmitted by data transmission module 408, such that error detection may be performed by printhead assembly 100 for each transmitted nozzle data packet 414. In some examples, error detection data 116 may be included less frequently, depending on factors such as impact on image quality, available data rates between printhead assembly 100 and printing system 400, etc.

As indicated by a step 506, fault data receiving module 410 may receive fault data 118 for errors associated with nozzle data 114. Fault data 118 may be received from, for example, a printhead assembly 100 in communication with printing system 400 that has received nozzle data 114 and error detection data 116 from printing system 400 (e.g., in a nozzle data packet 414), and that has detected errors associated with nozzle data 114 using error detection data 116. Fault data 118 may indicate, for example, the number of detected errors, the types of detected errors, the sequence of detected errors, the frequency of detected errors, etc. that are associated with nozzle data 114. In some examples, fault data 118 may be stored in a memory in processing electronics 106 of printhead assembly 100 and accessed by printing system 400 during printing of a print job. In some examples, fault data 118 may be pushed to printing system 400 by printhead assembly 100 during printing of a print job.

The amount and timing of fault data 118 received by fault data receiving module 410 may vary depending on factors such as available data channels and data rates used by printing system 400, the desired error detection performance, etc. For example, in some examples, fault data 118 may be accumulated for several nozzle data packets 414 and received by fault data receiving module 410 (e.g., using a bi-directional CSIO data channel) during printing of the print job at data rate lower than that which is used by data transmission module 408 to transmit nozzle data packets 414 (e.g., using a uni-directional LVDS data bus). In such examples, the amount of fault data accumulated may be reduced in order to accommodate the lower data rate while still providing error detection during printing of the print job. In some examples, fault data 118 may be received by fault data receiving module 410 (e.g., using a bi-directional LVDS data bus) during printing of the print job at the higher by data transmission module 408 to transmit nozzle data packets 414. In such examples, fault data 118 may be received by printing system 400 for each nozzle data packet 414 transmitted by data transmission module 408 during printing of the print job. Other amounts, rates, and timings for fault data 118 are contemplated as well.

As indicated by a step 508, fault data response module 412 may determine a response 416 to fault data 118. Fault data response 416 may depend on, for example, response thresholds for the number of detected errors, the types of detected errors, the sequence of detected errors, the frequency of detected errors, etc. that are associated with nozzle data 114, the impact of detected errors on image quality, etc. In some examples, data transmission errors associated with nozzle address data and/or fire signal data may have a greater impact on image quality than primitive firing data. For example, the same nozzle address data may be used for multiple primitives, while unique primitive firing data may be sent to each primitive. As such, detected errors corresponding to nozzle address data included in nozzle data 114 may be considered more critical than detected errors corresponding to primitive firing data included in nozzle data 114. As such, fault data response module 412 may apply a relatively higher response threshold to fault data 118 indicating a number, sequence or frequency of detected errors corresponding to primitive firing data then the response threshold it applies for to fault data 118 indicating a number, sequence or frequency of detected errors corresponding to nozzle address data. For example, fault data response module 412 may determine a fault data response 116 aborting a print job upon the first instance of fault data 118 indicating detected errors corresponding to nozzle address data, but may require multiple instances of fault data 118 indicating detected errors corresponding to primitive firing data before determining a fault data response 116 aborting the print job. Other threshold schemes for responding to different types of detected errors having varying levels of perceived criticality are contemplated as well.

Fault data response module 412 may determine different types of responses 416 to fault data 118. In some examples, fault data response 416 may instruct printing system 400 to abort or halt a print job so that diagnostics may be performed. In some examples, fault data response 416 may indicate that printhead assembly 100 has been installed incorrectly in printing system 400 and should be reinstalled. In some examples, fault data response 416 may instruct printing system 400 to disregard fault data 118 or otherwise allow fault data 118 to accumulate until a certain threshold is reached (e.g., based on a strike count function or frequency count function to eliminate nuisance data, or upon a response threshold as described above). In some examples fault data response 416 may implement error correcting codes that may be transmitted to printhead assembly 100 (e.g., to initiate servicing or cleaning procedures that may be performed during the print job). In some examples, fault data response module 412 may monitor and track fault data 118 over time so that data transmission error trends having a potential impact on data integrity and/or image quality may be identified and analyzed (e.g., to better understand underlying causes of certain errors). Such tracked errors may include critical and/or non-critical errors.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A printhead assembly, comprising:
   ink ejection devices having nozzles; and
   processing electronics in communication with the ink ejection devices, the processing electronics to:
   receive nozzle data for controlling the ink ejection devices;
   receive error detection data computed based on the nozzle data;
   detect an error associated with the nozzle data using the error detection data;
   generate fault data for the detected error; and
   transmit the fault data to a printing system to cause the printing system to perform an action addressing a fault indicated by the fault data.

2. The printhead assembly of claim 1, wherein the nozzle data and the error detection data are integrated together in a nozzle data packet, and wherein the processing electronics is to receive the nozzle data packet and to detect the error for the nozzle data packet.

3. The printhead assembly of claim 1, wherein the processing electronics is to transmit the fault data to the printing system in communication with the printhead assembly during printing of a print job.

4. The printhead assembly of claim 1, wherein the processing electronics is to detect the error using one of parity bits based on the nozzle data, a checksum based on the nozzle data, a cyclic redundancy check code based on the nozzle data, and a cryptographic hash code based on the nozzle data.

5. The printhead assembly of claim 1, wherein each of the nozzles has an address, wherein the nozzles are grouped into primitives, and wherein the nozzle data includes nozzle address data and primitive firing data, and the error detection data is based on the nozzle address data, and the detecting of the error comprises detecting an error in the nozzle address data based on the error detection data, the nozzle address data comprising an address of a nozzle.

6. The printhead assembly of claim 1, wherein the address is an address of a group of nozzles.

7. The printhead assembly of claim 1, wherein the processing electronics is to receive the nozzle data and the error detection data from the printing system over a first channel using a first data rate, and the processing electronics is to transmit the fault data to the printing system over a second channel using a second data rate less than the first data rate.

8. The printhead assembly of claim 7, wherein the processing electronics is to:
   receive the nozzle data and the error detection data in a plurality of data packets over the first channel, each data packet including a portion of the nozzle data and a respective portion of the error detection data computed based on the portion of the nozzle data;
   perform error detection for each data packet to generate respective fault data;
   accumulate fault data for multiple data packets of the plurality of data packets to form accumulated fault data; and
   transmit the accumulated fault data over the second channel to the printing system.

9. The printhead assembly of claim 1, wherein the fault data is to cause the printing system to abort or halt a print job of the printing system.

10. A method comprising:
    receiving nozzle data at a printhead assembly, the nozzle data for controlling ink ejection devices included in the printhead assembly and having nozzles;
    receiving error detection data at the printhead assembly, the error detection data computed based on the nozzle data;
    detecting an error in the nozzle data using the error detection data;
    generating fault data for the detected errors; and
    performing, in a printing system, an action addressing a fault indicated by the fault data.

11. The method of claim 10, wherein the nozzle data and the error detection data are integrated together in a nozzle data packet, wherein receiving the nozzle data and receiving the error detection data comprises receiving the nozzle data packet at the printhead assembly, and wherein detecting the error comprises detecting the error for the nozzle data packet.

12. The method of claim 10, wherein detecting the error includes using one of parity bits based on the nozzle data, a checksum based on the nozzle data, a cyclic redundancy check code based on the nozzle data, and a cryptographic hash code based on the nozzle data.

13. The method of claim 10, wherein each of the nozzles has an address, wherein the nozzles are grouped into primitives, and wherein the nozzle data includes nozzle address data and primitive firing data, and the error detection data is based on the nozzle address data, and the detecting of the error comprises detecting an error in the nozzle address data based on the error detection data, the nozzle address data comprising an address of a nozzle.

14. The method of claim 10, wherein the nozzle data and the error detection data are received from the printing system over a first channel using a first data rate, and the fault data is transmitted to the printing system over a second channel using a second data rate less than the first data rate.

15. The method of claim 14, further comprising:
    receiving the nozzle data and the error detection data in a plurality of data packets over the first channel, each data packet including a portion of the nozzle data and a respective portion of the error detection data computed based on the portion of the nozzle data;

performing error detection for each data packet to generate respective fault data;

accumulating, by the printhead assembly, fault data for multiple data packets of the plurality of data packets to form accumulated fault data; and transmitting, by the printhead assembly, the accumulated fault data to the printing system.

16. A printing system comprising:

an interface to receive a printhead assembly, the printhead assembly including ink ejecting devices having nozzles; and processing electronics connected to the interface, the processing electronics to:

transmit nozzle data packets via the interface, the nozzle data packets including nozzle data for controlling the ink ejection devices during a print job and error detection data computed based on the nozzle data;

receive fault data via the interface for errors associated with the nozzle data via the interface during the print job; and perform an action addressing a fault indicated by the fault data.

17. The printing system of claim 16, wherein the interface includes a first data interface and a second data interface, wherein the first data interface is a unidirectional data interface for transmitting the nozzle data packets to the printhead assembly, wherein the second data interface is a bidirectional data interface for receiving the fault data from the printhead assembly, and wherein the first data interface operates at a relatively higher data rate than the second data interface.

18. The printing system of claim 16, wherein the processing electronics is to perform the action based on one of a number of errors, a type of error, an error sequence, and an error frequency for the errors associated with the nozzle data.

19. The printing system of claim 16, wherein the action comprises aborting or halting the print job.

20. The printing system of claim 16, wherein the nozzle data includes nozzle address data and primitive firing data, and the error detection data is based on the nozzle address data, and the errors are errors in the nozzle address data based on the error detection data, the nozzle address data comprising addresses of nozzles.

* * * * *